United States Patent [19]

Renault et al.

[11] 3,860,392

[45] Jan. 14, 1975

[54] COLORANT COMPOSITIONS AND METHOD

[75] Inventors: Claude Renault; Michel Sleghem, both of Antony, France

[73] Assignee: Pechiney-Saint Gobain Produits Chimiques, Neuilly-sur-Seine, France

[22] Filed: Jan. 20, 1971

[21] Appl. No.: 108,229

[30] Foreign Application Priority Data
Feb. 6, 1970 France .............................. 70.04252
Oct. 23, 1970 France .............................. 70.38314
Feb. 6, 1970 France .............................. 70.04253

[52] U.S. Cl. ........................... 8/169, 8/172, 8/173, 8/89, 8/90, 8/86
[51] Int. Cl. ............................................. D06p 5/04
[58] Field of Search ............ 8/90, 92, 93, 174, 175, 8/169

[56] References Cited
UNITED STATES PATENTS
2,028,091  1/1936  Jaeger ...................................... 8/90
2,828,180  3/1958  Sertorio .................................... 8/62
3,129,053  4/1964  Castle ....................................... 8/93
3,186,979  6/1965  Hall et al. ............................. 260/153
3,211,514  10/1965  Casty ....................................... 8/90
3,265,461  8/1966  Luetzel .................................... 8/84
3,469,930  9/1969  Harrell et al. ............................ 8/90

FOREIGN PATENTS OR APPLICATIONS
1,449,325  6/1965  France .................................... 8/92
1,017,864  1/1966  Great Britain ........................... 8/90

OTHER PUBLICATIONS
Coward, Amer. Dyestuff Rep., April 27, 1964, pp. 27–29, TP890A152.
Colour Index, 2nd Edition 1956, pp. 2815–2816.

*Primary Examiner*—Donald Levy

[57] ABSTRACT

A process for the preparation of colorant compositions dispersible in an organic medium from coloring materials or dyes normally insoluble or not dispersible in organic solvent medium but which are soluble or dispersible in an aqueous medium. Such compositions are primarily of interest in the field of dyeing of natural and synthetic fibers, and the present invention extends to a method of using the colorant compositions for the dyeing of such fibers.

15 Claims, No Drawings

COLORANT COMPOSITIONS AND METHOD

In numerous cases in the coloring of various materials and surfaces, it is useful, and sometimes essential, to be able to use dyes in the form of solutions or dispersions in organic solvents. Coloring materials or dyes which are soluble in halogenated, non-flammable organic solvents, which solvents possess desirable advantages from the point of view of safety in use, are very few in number. Coloring materials or dyes which are soluble or dispersible in an aqueous medium, many of which find application in the dyeing of textile fibers, are more numerous and have a wide-range of variety of characteristics, some of which are not possessed by the materials soluble in organic solvents. These coloring materials or dyes soluble or dispersible in an aqueous medium are insoluble and not dispersible in an organic solvent medium, and consequently it has not usually been possible to utilize them in dyeing techniques which require their application in organic solvents.

In copending application Ser. No. 36,470 filed on May 11, 1970, description is made of a process for the preparation of coloring compositions in an organic solvent medium, the colorants being soluble in an aqueous medium but insoluble in an organic solvent medium.

One object of the present invention is to provide a process for the preparation of a colorant composition which is dispersible in an organic solvent medium from colorants dispersible in aqueous medium but insoluble and non-dispersible in an organic solvent medium.

Another object of the present invention is to provide a colorant composition dispersed in an organic solvent medium.

A further object of the present invention is to provide a method of coloring natural and synthetic textile fibers.

One aspect of the present invention resides in a process for the preparation of a colorant composition dispersible in an organic solvent medium, the colorants being dispersible in aqueous medium but insoluble and not dispersible in an organic solvent medium, in which into a concentrated aqueous dispersion of the colorant are incorporated at least one emulsifying agent selected from the group consisting of anionic and non-ionic emulsifying agents in a neutral medium and at least an ingredient selected from the group consisting of acids and, preferably, anionic emulsifying agents in an acidic medium.

Preferably, the aqueous dispersion of the colorant represents from 30 to 75% by weight of the final composition and contains from 50 to 150 parts by weight of colorant per 100 parts water, the emulsifying agent in the neutral medium represents from 40 to 200 parts by weight per 100 parts of colorant and the ingredient represents from 10 to 300 parts by weight per 100 parts of colorant.

For the purpose of simplifying mixing of the components of the compositions, the ingredients are incorporated in the composition in admixture with an organic solvent. As the organic solvent it is preferred to use one or more non-flammable solvents, such as halogenated hydrocarbons, for example perchlorethylene, trichlorethylene, 1,1,1-trichlorethane and methylene chloride.

Conveniently, the preparation of the composition is carried out at a temperature between 20° and 40° C.

The anionic emulsifying agents in neutral medium which may be used include neutral salts of alkyl aryl sulphonic acids and dialkyl sulphosuccinic acids, such as sodium dodecylbenzene sulphonate and triethanolamine dioctyl sulphosuccinate.

The non-ionic emulsifying agents in neutral medium which may be used include alkyl phenoxy polyoxyethylene such as nonylphenol having eight ethylene oxide groups.

The acids which may be used include sulphuric, phosphoric, acetic and formic acids.

The anionic emulsifying agents in acidic medium which may be used include:

acid phosphate of non-ionic compounds, and preferably dialkyl phenoxy polyoxyethylene monoacid phosphates such as dinonyl phenyloxyethylene monoacid phosphate, alkyl polyoxyethylenediacid phosphates and especially ethylhexanoloxyethylene phosphate, dialkylpolyoxyethylene monoacid phosphates and especially the acid phosphate of a non-ionic compound of lauric alcohol; alkaline alkyl aryl sulphonates for example sodium dodecylbenzene sulphonate and alkaline dialkylsulphosuccinates, such as sodium dioctylsulphosuccinate.

Colorants dispersible in aqueous medium which may be used in the present process are selected from the group of colorants known as "plastosoluble" or "dispersed", the molecules of which are small and do not possess an "auxochrome" group conferring solubility in aqueous medium, as represented by aminoazoics and hydroxyazoics, aminoanthraquinones and hydroxyanthraquinones, colorants known as "acidic," such as azoics and derivatives of triphenyl methane, colorants known as "reactive," such as those having in their molecule a triazinic nucleus or a vinyl sulphone group or colorants known as "basic," such as azoics and amine derivatives of triphenyl methane.

The compositions prepared by the process according to the invention may be diluted in an organic solvent medium to give a stable dispersion.

The present invention also extends to colorant compositions dispersible in an organic solvent medium, prepared according to the process of the invention.

Having described the basic concepts of the invention, reference is now made to the following examples which are provided by way of illustration, and not of limitation, of the practice of this invention in a process for the preparation of colorant compositions and the use of such compositions in the dyeing of fibers and the like.

EXAMPLE 1

An aqueous dispersion of 10 g of Terasil GF blue colorant (Color Index Reference: Disperse Blue 54) in 10 g of water and 5 g of mixture of emulsifying agent composed of 70% by weight of dodecylbenzene sulphonic acid neutralized with triethanolamine and 30% by weight of nonylphenol having 10 ethylene oxide groups were mixed for 5 minutes.

A mixture of 5 g of nonylphenyl monoacid phosphate having six ethylene oxide groups and 5 g of perchlorethylene was then added and mixing continued for a further 5 minutes.

The composition prepared was in the form of paste which on dilution in an organic solvent medium gave a stable dispersion.

EXAMPLE 2

An aqueous dispersion of 10 g of Terasil B Scarlet colorant (Color Index Reference: Disperse Red 56) in 12 g of water and 7.5 g of a mixture of emulsifying agents composed of 70% by weight of dodecylbenzene sulphonic acid neutralized with thiethanolamine and of 30% by weight of nonylphenol having 10 ethylene oxide groups were mixed for five minutes.

A mixture of 2 g of acetic acid of 80% strength and 4 g of perchlorethylene was then added and mixing was continued for a further 5 minutes.

The composition thus prepared was in the form of paste which on dilution in an organic solvent medium gave a stable dispersion.

EXAMPLE 3

An aqueous dispersion of 10 g of a blue colorant (Color Index Reference: Acid Blue 62) in 10 g of water and 20 g of a mixture of emulsifying agents composed of 70% by weight of dodecylbenzene sulphonic acid neutralized with triethanolamine and 30% by weight of nonylphenol having 10 ethylene oxide groups were mixed for 5 minutes.

A mixture of 10 g of nonylphenyl monoacid phosphate having six ethylene oxide groups and of 10 g of perchlorethylene was then added and mixing was continued for a further 5 minutes.

The composition thus prepared was in the form of paste which on dilution in an organic solvent medium gave a stable dispersion.

EXAMPLE 4

An aqueous dispersion of 10 g of a green colorant (Color Index Reference: Acid Green 43) in 20 g of water and 20 g of a mixture of emulsifying agents composed of 70% by weight of dodecylbenzene sulphonic acid neutralized with triethanolamine and of 30% by weight of nonylphenol having 10 ethylene oxide groups were mixed for 5 minutes.

A mixture of 10 g of nonylphenyl monoacid phosphate having six ethylene oxide groups and 10 g of perchlorethylene was then added and mixing was continued for a further 5 minutes.

The composition thus prepared was in the form of paste which on dilution in an organic solvent medium gave a stable dispersion.

EXAMPLE 5

An aqueous dispersion of 10 g of a red colorant (Color Index Reference: Basic Red 26) in 15 g of water and 20 g of a mixture of emulsifying agents composed of 70% by weight of dodecylbenzene sulphonic acid neutralized with triethanolamine and 30% by weight of nonylphenol having 10 ethylene oxide groups were mixed for 5 minutes.

A mixture of 10 g of nonylphenyl monoacid phosphate having six ethylene oxide groups and of 10 g of perchlorethylene was then added and mixing was continued for a further 5 minutes.

The composition thus prepared was in the form of paste which on dilution in an organic solvent medium gave a stable dispersion.

EXAMPLE 6

An aqueous dispersion of 10 g of a yellow colorant (Color Index Reference: Reactive Yellow 14) in 20 g of water and 20 g of a mixture of emulsifying agents composed of 70% by weight of dodecylbenzene sulphonic acid neutralized with triethanolamine and 30% by weight of nonylphenol having 10 ethylene oxide groups were mixed for 5 minutes.

A mixture of 10 g of nonylphenyl monoacid phosphate having six ethylene groups and 10 g of perchlorethylene was then added and mixing was continued for a further 5 minutes.

The composition thus prepared was in the form of paste which on dilution in an organic solvent medium gave a stable dispersion.

The colorant compositions according to the invention find application in the coloring of various materials such as leather and natural and synthetic fibers and of various surfaces, such as those of metal, wood and paper.

For example, as regards the dyeing of textile fibers both natural and synthetic, it is common industrial practice to use a colorant dissolved or dispersed in an essentially aqueous medium.

Synthetic fibers such as those derived from polyamides or acrylonitrile polymers or copolymers may be dyed with such an aqueous colorant medium making use of the chemical reactions which occur between the fiber and the colorant. By contrast, most of the synthetic fibers, such as chlorofibers or those derived from polyesters and polyolefines, because of their chemical inertness and their hydrophobic character, necessitates dyeing conditions which cause physical modifications in the structure of the fibers to enable penetration and diffusion of the colorant into the fibers to take place. These physical modifications are produced either by heat treatment or by the use of agents known as "carriers," in the form of heavy solvents having a high boiling point and which possess the ability to cause the fibers to swell, and which thus allow the colorant to diffuse more easily into the midst of the molecular structure. The "carrier" is dispersed by means of an emulsifying agent in a large volume of water.

Thus, there are used various methods of dyeing with aqueous colorant mediums such as — Discontinuous methods in which a bath of the aqueous colorant medium is used to exhaustion, at temperatures up to 100° C when a "carrier" is present, at temperatures above 100° C when no "carrier" is present.

— Continuous methods which involve impregnation and squeezing of the fiber followed by thermofixation by the use of steam.

— Continuous methods which involve impregnation, squeezing and drying of the fiber followed by dry thermofixation.

These methods have certain disadvantages, among which may be mentioned: Large water consumption, pollution of river waters by the discarding of residual water containing colorants and large consumption of heat for carrying out the operation of drying the fibers by evaporation of water.

The method described above using dry thermofixation possesses, when compared with the method using steam thermofixation, provide certain advantages including the reducing of the risk of colorant migration, of not requiring a leak-tight installation in which to carry out the method, and of being relatively quick because high temperatures can be used. The dry thermofixation method is used with success industrially only, however, for polyester fibers, since the temperatures required for effective thermofixation involve the risk of causing chemical degradation or contraction of fibers such as those formed from polyamides and acylonitrile polymers and copolymers.

The applicant has discovered a continuous method for dyeing natural or synthetic fibers and this constitutes another aspect of the present invention, which method materially reduces the previously mentioned disadvantages of the known methods and which enables various treatments, especially antistatic, oleofugic or hydrofugic treatment to be carried out on the fibers at the same time as they are being dyed.

According to a further aspect of the present invention a continuous method of dyeing natural or synthetic textile fibers comprises impregnating the fibers in a colorant composition prepared by the process of the invention dispersed in an organic solvent medium, removing excess liquid, and drying the impregnated fibers and fixing the colorant by heating in air or steam.

The dyeing method of the invention enables an immediate and regular deposition of the colorant to be obtained on substantially any fiber, natural or synthetic.

The mechanical and physical means, well known to persons skilled in the dyeing art may be used in the present method as may be the known apparatus and installations used for the recovery of the solvents for reuse. Thus for example, the operations of impregnation and removal of excess liquid may be carried out by immersion of the fabric to be treated in the dye-bath according to the padding technique, the operation of drying by subjecting the fabric to infra-red radiation, and the thermofixation operation, either by passing the fabric through a tunnel in which hot air is circulated, (dry thermofixation), or by introducing the fabric into a closed vessel, known as a steamer, into which steam is introduced (steam thermofixation).

Preferably, in the dyeing method according to the invention, the impregnation and removal of excess liquid operations are carried out at a temperature ranging from 10° to 50° C and preferably ranging from 20° to 30° C, the drying operation at a temperature ranging from 30° to 80° C and preferably ranging from 40° to 50° C, and the thermofixation operation, either dry or by steaming, at a temperature ranging from 80° to 250° C, and for a period of from 30 seconds to 30 minutes, the time and temperature parameters associated with the thermofixation operation depending upon the nature of the fiber to be treated and on the thermofixation operation chosen.

As will be appreciated, the colorant compositions used in the present method for dyeing are selected from among those giving tinctorial performances which are stable to dry cleaning and to washing methods suitable for the various fibers.

Fibers capable of being dyed by the present method include wool and fibers derived from polyesters, polyamides, and acrylonitrile polymers and copolymers.

The following illustrative example illustrates the method of dyeing according to the present invention.

A polyester fiber fabric, known industrially by the name of "Tergal" having a density of 100 g/m², was impregnated at a temperature of 20° C with a colorant composition according to the invention dispersed in 1,000 cm³ of perchlorethylene and then squeezed on a padder. The colorant composition was prepared by mixing, for five minutes, an aqueous dispersion of 10 g of blue colorant Terasil GF (Color Index Reference: Disperse Blue 54) in 10 g of water and 5 g of a mixture of emulsifying agents composed of 70% by weight of dodecylbenzene sulphonic acid neutralized with triethanolamine and of 30% of nonylphenol having 10 ethylene oxide groups, then adding 5 g of nonylphenyl monoacid phosphate having six ethylene oxide groups and continuing the mixing for a further 5 minutes.

The fabric, which had retained 86% of the composition based on the weight of the fabric, was dried in hot air and then dry thermofixed at 210° C for 60 seconds.

The fabric thus dyed was of a vivid color.

The dry cleaning and washing stabilities of the dyed fabric were determined in a washing apparatus known by the name "Wash Wheel" which comprises as many pots as there are samples to be tested. The pots, each having a capacity of 500 cm³ and hermetically sealed, were attached to a wheel rotating at 44 r.p.m. in a thermostatically controlled bath.

The test conditions were as follows:

| Dry Cleaning | |
|---|---|
| Duration: | 15 minutes |
| Temperature: | 20°C |
| Mass of Sample: | 1.5 g |
| Nature of Solvent: | Perchlorethylene |
| Bath ratio: | $\frac{\text{(Mass of sample in g.)}}{\text{(Volume of Solvent in cm}^3\text{)}} = \frac{1}{100}$ |
| Washing: | |
| Duration: | 30 minutes |
| Temperature: | 60°C |
| Mass of sample: | 1.5 g |
| Nature of solution | Commercial washing liquid, 5g/liter, containing no optical azure-producer |
| Bath ratio: | $\frac{\text{(Mass of sample in g.)}}{\text{(Volume of solution in cm}^3\text{)}} = \frac{1}{100}$ |

Practically no discharge of color was observed from the sample in either of the tests.

It will be understood by those skilled in the art that various changes and modifications can be made in the details of formulation, procedure and use without departing from the spirit of the invention, especially as defined in the following claims.

We claim:

1. A process for the preparation of a colorant composition dispersible in an organic solvent medium from dyes dispersible in an aqueous medium but insoluble and non-dispersible in an organic solvent medium, comprising incorporating in a concentrated aqueous dispersion of the dye a solution of an emulsifying agent selected from the group consisting of a long chain alkylbenzene sulfonate and a dialkyl sulfosuccinate ethanol amine salt and a nonionic alkylphenol-ethylene oxide condensate solution, and mixing the resulting mixture with a phosphated long chain alkylphenolalkylene oxide condensate in a one carbon or two carbon chlorinated hydrocarbon to produce a composition in which the dye is contained in the chlorinated hydrocarbon.

2. A process according to claim 1 in which the aqueous dispersion of the dye represents from 30 to 75% by weight of the final composition and contains from 50 to 150 parts by weight of dye per 100 parts of water.

3. A process according to claim 1 in which the emulsifying agent represents 40 to 200 parts by weight per 100 parts by weight of dye.

4. A process according to claim 1 in which the condensate represents from 10 to 300 parts by weight per 100 parts of dye.

5. A process according to claim 1 in which the chlorinated hydrocarbon is selected from the group of solvents consisting of perchlorethylene, trichlorethylene, 1,1,1-trichlorethane and methylene chloride.

6. A process according to claim 1 in which the preparation of the composition is carried out at a temperature between 20° and 40° C.

7. A process according to claim 1 in which the condensate is dinonylphenyloxyethylene monoacid phosphate.

8. A process according to claim 1 in which the emulsifying agent is sodium dodecylbenzene sulphonate.

9. A process according to claim 1 in which the dye dispersible in the aqueous medium is selected from the group consisting of plastosoluble and dispersed dyes and dyes having molecules which are of small dimensions and do not possess "auxochrome" groups conferring solubility in aqueous medium.

10. A process according to claim 9 in which the dye is selected from the group consisting of aminazoics, hydroxyazoics, aminoanthraquinones, and hydroxyanthraquinones.

11. A process according to claim 1 in which the emulsifying agents are selected from the group consisting of sodium dodecylbenzene sulphonate and triethanolamine dioctyl sulphosuccinate.

12. A process according to claim 1 in which the dye is selected from the group consisting of acid colorants.

13. A colorant composition dispersible in an organic solvent medium prepared by the process of claim 1.

14. A process according to claim 1 in which the non-ionic alkyl phenol-ethylene oxide is nonylphenol containing eight ethylene oxide groups.

15. A process for the preparation of a colorant composition dispersible in an organic solvent medium from dyes dispersible in an aqueous medium but insoluble and non-dispersible in an organic solvent medium, comprising incorporating in a concentrated aqueous dispersion of the dye (1) an emulsifying agent selected from the group consisting of a long-chain alkylbenzyl sulfonate and a dialkylsulfosuccinate ethanol amine salt and (2) a non-ionic alkylphenol-ethylene oxide solution, and mixing the resulting mixture with a phosphated long-chain alkylphenol-alkylene oxide condensate in a $C_1$ to $C_2$ chlorinated hydrocarbon selected from the group consisting of perchloroethylene, trichloroethylene, 1,1,1-trichloroethane and methylene chloride.

* * * * *